United States Patent
Ogawa

(10) Patent No.: US 9,487,355 B2
(45) Date of Patent: Nov. 8, 2016

(54) AUTOMATED WAREHOUSE

(75) Inventor: Kazuhiko Ogawa, Inuyama (JP)

(73) Assignee: Murata Machinery, Ltd., Kyoto (JP)

(*) Notice: Subject to any disclaimer, the term of this patent is extended or adjusted under 35 U.S.C. 154(b) by 572 days.

(21) Appl. No.: 13/704,745

(22) PCT Filed: May 9, 2011

(86) PCT No.: PCT/JP2011/002569
§ 371 (c)(1),
(2), (4) Date: Dec. 17, 2012

(87) PCT Pub. No.: WO2011/158426
PCT Pub. Date: Dec. 22, 2011

(65) Prior Publication Data
US 2013/0094927 A1     Apr. 18, 2013

(30) Foreign Application Priority Data
Jun. 18, 2010 (JP) ................. 2010-139928

(51) Int. Cl.
*G01C 3/08* (2006.01)
*B65G 1/04* (2006.01)
*B65G 1/06* (2006.01)

(52) U.S. Cl.
CPC ............... *B65G 1/04* (2013.01); *B65G 1/065* (2013.01); *G01C 3/08* (2013.01); *B65G 1/0421* (2013.01)

(58) Field of Classification Search
CPC ................. B64G 1/04; G01C 3/08
See application file for complete search history.

(56) References Cited

U.S. PATENT DOCUMENTS

| | | | | |
|---|---|---|---|---|
| 3,800,963 A * | 4/1974 | Holland | ................ | B65G 1/065 191/12.2 R |
| 5,152,655 A * | 10/1992 | Pipes | ................ | B65G 1/0485 188/DIG. 1 |
| 6,269,302 B1 * | 7/2001 | Yoshida | ................ | G01S 3/48 340/928 |
| 7,465,141 B1 * | 12/2008 | Fournier | ................ | E04H 6/28 414/234 |

(Continued)

FOREIGN PATENT DOCUMENTS

| | | |
|---|---|---|
| JP | 02-008106 A | 1/1990 |
| JP | 07-215419 A | 8/1995 |

(Continued)

OTHER PUBLICATIONS

Port Authority of NY & NJ, "Bridges and Tunnels: Facts and Info". http://www.panynj.gov/bridges-tunnels/gwb-facts-info.html.*

(Continued)

*Primary Examiner* — Luke Ratcliffe
*Assistant Examiner* — Samantha K Abraham
(74) *Attorney, Agent, or Firm* — Keating & Bennett, LLP

(57) ABSTRACT

A vehicle system includes multiple vehicles which shuttle on linear paths; a reflecting member provided on one end-side of each path; a range finding device measuring, using a laser beam, a distance between a vehicle and the reflecting member; and a communications system including a stationary communications device provided on an other end-side of the traveling path for the traveling vehicle, and performing optical wireless communication; and a mobile communications device attached to the traveling vehicle and performing wireless communication with the stationary communications device.

6 Claims, 4 Drawing Sheets

(56) References Cited

U.S. PATENT DOCUMENTS

| | | | |
|---|---|---|---|
| 2008/0129545 A1* | 6/2008 | Johnson et al. | 340/933 |
| 2008/0309946 A1* | 12/2008 | Chou | 356/487 |
| 2009/0141260 A1* | 6/2009 | Kitano | 356/3.11 |
| 2009/0198371 A1* | 8/2009 | Emanuel | B66F 9/0755 700/226 |

FOREIGN PATENT DOCUMENTS

| | | |
|---|---|---|
| JP | 11-059819 A | 3/1999 |
| JP | 3148510 U | 2/2009 |

OTHER PUBLICATIONS

Halbfinger, David M. The New York Times, "E-Z Pass to Start at Hudson River Tunnels". Paragraph 3. Published Oct. 27, 1997. http://www.nytimes.com/1997/10/27/nyregion/e-z-pass-to-start-at-hudson-river-tunnels.html.*

Official Communication issued in International Patent Application No. PCT/JP2011/002569, mailed on Jul. 12, 2011.

English translation of Official Communication issued in corresponding International Application PCT/JP2011/002569, mailed on Jan. 17, 2013.

* cited by examiner

AUTOMATED WAREHOUSE

BACKGROUND OF THE INVENTION

1. Field of the Invention

The present invention relates to a vehicle system which includes multiple paths extending in parallel, and vehicles each shuttling on a corresponding one of the paths.

2. Description of the Related Art

Conventionally, there is a device to automatically load and unload multiple articles onto and from racks used for vertically and horizontally placing and storing the articles. Such a device is introduced in Japanese Unexamined Patent Application Publication No. 11-59819 as an on-rail wheeled platform system, and is also referred to as a stacker crane.

The stacker crane is equipped with a transfer device to transfer an article to load and unload the article between the racks. The entire stacker crane horizontally travels along the racks, and the transfer device vertically shuttles. Such a feature makes it possible for the stacker crane to transfer an article stored on any position of the racks. Here, a position of the stacker crane in a horizontal direction is detected by a laser range finding device. The detected data is transmitted to a central control system through optical wireless communication. Hence, the stacker crane is disposed at a desired position.

One of recently proposed vehicle systems includes shelf boards, a rack, rails, and vehicles. The shelf boards are vertically provided to the rack. The number of the rails is equivalent to that of the shelf boards, and each of the rails forms a path and is provided to a position corresponding to one of the shelf boards. Each of the vehicles is provided to one of the paths to horizontally transport an article. Such a vehicle system has a vehicle independently travel to each shelf board. Compared with the stacker crane, the system achieves significantly greater work efficiency in loading and unloading articles onto and from the racks.

In loading and unloading an article at a desired position of a rack, however, the vehicle system needs to measure a position for each of the vehicles in a horizontal direction, and transmit the measured data to each of the vehicles to control the vehicles. In other words, each vehicle has to have a laser range finding device and a communication device to exchange detected data. Here, a laser beam from the range finding device and light for the communication can cause interference with each other, which would increase the risk of an adverse effect to the communication and the distance measurement.

It is noted that in the following description, the language "interference" indicates not only physical interference of light but also simply indicates "an effect on distance measurement and communication".

SUMMARY OF THE INVENTION

Preferred embodiments of the present invention provide a vehicle system which includes laser range finding devices and communication devices, and significantly reduces interference of light, precisely measures distances and performs good communication.

A vehicle system according to a preferred embodiment of the present invention includes a first vehicle that shuttles on a first path which is linear and a second vehicle which shuttles on a second path that is parallel or substantially parallel and vertically spaced relative to the first path. The vehicle system includes a first reflecting member which is provided on one end-side of the first path; a first range finding device which measures, using a laser beam, a distance between one end of the first vehicle and the first reflecting member, the one end being defined in a direction of a first width that is perpendicular or substantially perpendicular to the first path; a first communications system including a first stationary communications device which is provided on another end-side of the first path, and performs optical wireless communication; and a first mobile communications device which is attached to another end of the first vehicle defined in the direction of the first width, and performs wireless communication with the first stationary communications device; a second reflecting member which is provided on one end-side of the second path; a second range finding device which measures, using a laser beam, a distance between one end of the second vehicle and the second reflecting member, the one end being defined in a direction of a second width that is perpendicular or substantially perpendicular to the second path; and a second communications system including a second stationary communications device which is provided on another end-side of the second path, and performs optical wireless communication; and a second mobile communications device which is attached to another end of the second vehicle defined in the direction of the second width and performs wireless communication with the second stationary communications device, wherein the first vehicle and the second vehicle are disposed so that the direction of the first width and the direction of the second width are parallel or substantially parallel to each other, and the first mobile communications device and the second mobile communications are disposed on opposite sides of a virtual plane which joins a center of the first width and a center of the second width, and extends along the first path and the second path.

This structure makes it possible to measure the distance with a laser beam on one side of the traveling path with respect to a traveling vehicle in order to specify the position of the traveling vehicle, and perform communication on the other side of the traveling path in order to control the traveling vehicle. Consequently, the structure successfully minimizes the risk of the range-finding laser beam and the communication light interfering with each other, and assures precise distance measurement and good communication performance.

The first vehicle and the second vehicle may be collectively referred to as "vehicle", the first path and the second path may be collectively referred to as "path", the first reflecting member and the second reflecting member may be referred to as "reflecting member", the first range finding device and the second range finding device may be referred to as "range finding device", the first communications device and the second communications device may be collectively referred to as "communications device", the first stationary communications device and the second stationary communications device may be collectively referred to as "stationary communications device", the first mobile communications device and the second mobile communications device may be collectively referred to as "mobile communications device", a first width direction and a second width direction may be collectively referred to as "width direction", a first polarizing plate and a second polarizing plate may be collectively referred to as "polarizing plate", a first polarizing direction and a second polarizing direction may be collectively referred to as "polarizing direction", and a first modulating frequency and a second modulating frequency may be collectively referred to as "modulating frequency".

Such a feature allows the axis of the laser beam from the range finding device and the axis of the light from the communications device to be staggered with each other in the width direction perpendicular or substantially perpendicular to the path. Hence, this arrangement successfully reduces the risk of an adverse effect, to the communication and the distance measurement, caused by interference of the range-finding laser beam and the communication light with each other.

This arrangement successfully prevents interference of light in vertical levels, and reduces the risk of an adverse impact on the communication and the distance measurement between vertically disposed vehicles.

The first communications system may include a first polarizing plate, and perform communication using light in a first polarizing direction. The second communications device may includes a second polarizing plate, and perform communication using light in a second polarizing direction which is different from the first polarizing direction.

This feature successfully prevents two communications devices that are located near each other from causing communication interference.

The first communications system may preferably perform communication on a first modulation frequency. The second communications device may preferably perform communication on a second modulation frequency which is different from the first modulation frequency.

This feature successfully prevents two communications devices that are located near each other from causing communication interference.

Moreover, two kinds of polarizing directions of light and two kinds of modulating frequencies may preferably be combined to achieve four kinds of communications techniques.

Such a feature allows the same communication technique to be used for every four vehicles, which further contributes to preventing communication interference.

The first stationary communications device and the second stationary communications device may preferably be provided on a same side of the first path and the second path.

Such a feature allows multiple stationary communications devices to be provided on either side of the paths. Consequently, the wiring is made easy for power supply and for wire communication to the stationary communications devices.

A range finding method according to another preferred embodiment of the present invention is used for a vehicle system which includes a first vehicle that shuttles on a first path which is linear and a second vehicle which shuttles on a second path provided parallel or substantially parallel and vertically spaced relative to the first path. The range finding method includes measuring, via a first range finding device using a laser beam, a distance between a first reflecting member which is provided on one end-side of the first path and one end of the first vehicle, the one end being defined in a direction of a first width perpendicular or substantially perpendicular to the first path; performing optical wireless communication between a first stationary communications device which is provided on another end-side of the first path and a first mobile communications device which is attached to another end of the first vehicle defined in the direction of the first width; measuring, via a second range finding device using a laser beam, a distance between a second reflecting member which is provided on one end-side of the second path and one end of the second vehicle, the one end being defined in a direction of a second width perpendicular or substantially perpendicular to the second path; and performing optical wireless communication between a second stationary communications device which is provided on another end-side of the second path and a second mobile communications device which is attached to another end of the second vehicle defined in the direction of the second width and opposite to the first mobile communications device in a direction of a width.

This method makes it possible to measure the distance with a laser beam on one side of the traveling path with respect to a traveling vehicle in order to specify the position of the traveling vehicle, and perform communication on the other side of the traveling path in order to control the traveling vehicle. Consequently, the structure successfully minimizes the risk of the range-finding laser beam and the communication light interfering with each other, and assures precise distance measurement and good communication performance.

Preferred embodiments of the present invention successfully prevent light interference to maintain high accuracy in distance measurement, and reliably provide high communication quality.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Described below is a vehicle system according to preferred embodiments of the present invention with reference to the drawings.

Figure 1:
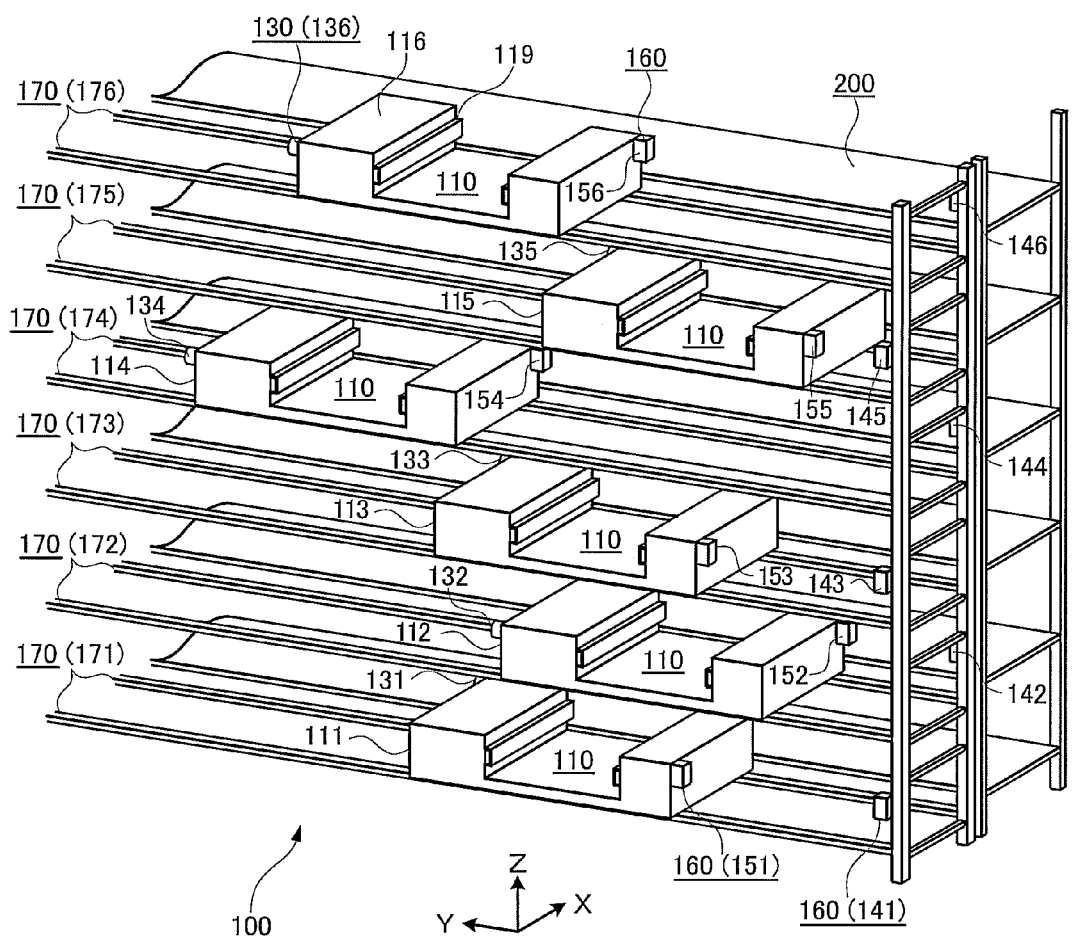
FIG. 1 depicts a perspective view which schematically shows an end of a vehicle system according to a preferred embodiment of the present invention.

FIG. 1 depicts a perspective view which schematically shows an end of the vehicle system according to a preferred embodiment of the present invention.

Figure 2:
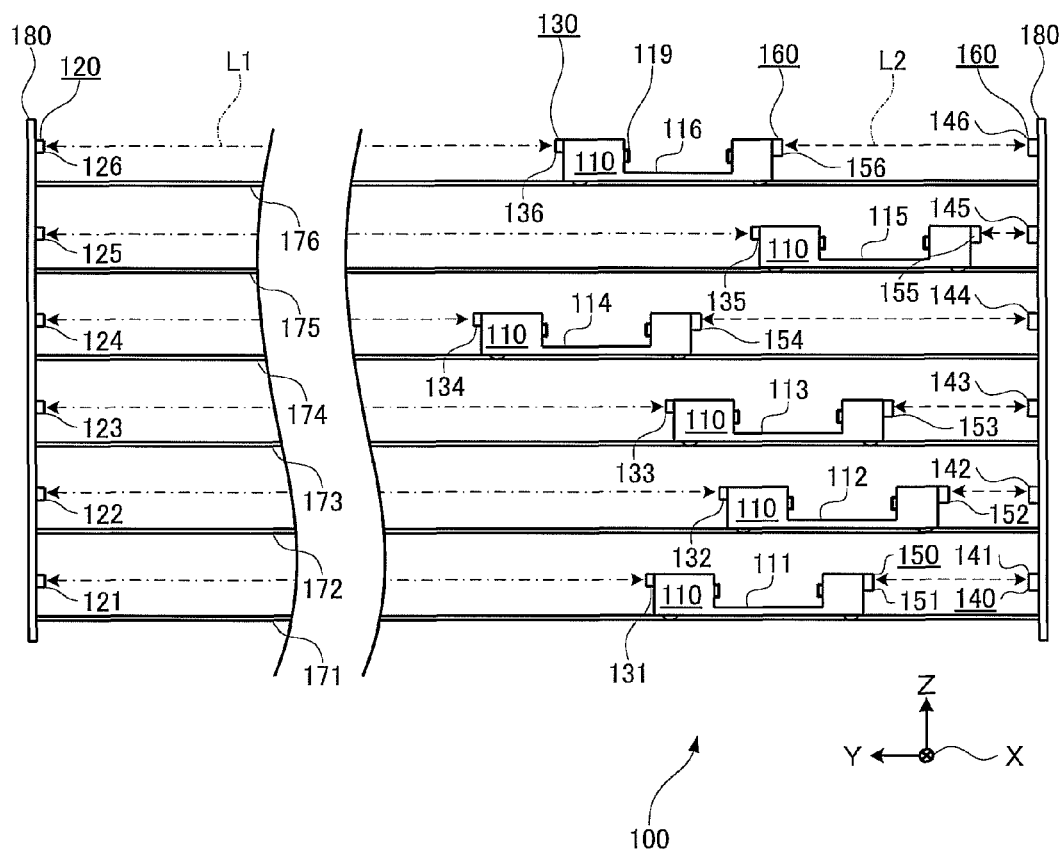
FIG. 2 depicts a plan view which schematically shows the vehicle system from the front according to a preferred embodiment of the present invention.

FIG. 2 depicts a plan view which schematically shows the vehicle system from the front.

The vehicle system 100 in the drawings preferably includes multiple vehicles 110 to transfer articles to a rack 200 provided along paths. The vehicle system 100 includes the vehicles 110, reflecting members 120, range finding devices 130, and communications devices 160.

Each of the vehicles 110 shuttles on a linear path. In the present preferred embodiment, the vehicle 110 shuttles along a rail 170 which defines a path extending in the y-axis direction. The vehicle 110 is equipped with a wheel and a motor (not shown) to drive the vehicle 110 itself, and includes a transfer device 119 to move an article. Moreover, the vehicle system 100 includes multiple rails 170 which include the rail 170 and preferably are vertically (in the z-axis direction) arranged in six levels, for example. One vehicle 110 is preferably set to a rail 170 on each level. It is noted that a first vehicle 111 is set to a first rail 171 which defines a first path provided at the lowest level, and a second vehicle 112 is set to a second rail 172 which defines a second path provided directly above the first path.

Using a laser beam, each of the range finding devices 130 measures the distance between the vehicle 110 and a reflecting member 120 provided on one end-side (on the left in FIG. 2) of the path for the vehicle 110. In the present preferred embodiment, the range finding device 130 is provided to an end (facing the reflecting member 120) of the vehicle 110. The range finding device 130 horizontally emits a laser beam L1 to the reflecting member 120, and receives the reflected laser beam off the reflecting member 120. Based on a phase difference between the emitted (sent) laser beam L1 and the received laser beam L1, the range finding device 130 detects the distance between the range finding device 130 and the reflecting member 120, that is to detect the position of the vehicle 110 on the path with respect to the position of the reflecting member 120. In the vehicle system 100, each of the vehicles 110 includes a range finding device 130. It is noted that the first vehicle 111 includes a first range finding device 131, and the second vehicle 112 includes a second range finding device 132.

The reflecting member 120 is provided on one end-side (on the left in FIG. 2) of the path for the vehicle 110. The reflecting member 120 reflects the laser beam L1, which the range finding device 130 emits, back to the range finding device 130. In the present preferred embodiment, the reflecting member 120 is referred to as a reflector attached to a pillar 180 used to support the rails 170. The reflector 120 is capable of reflecting the laser beam L1 with a high efficiency. In the vehicle system 100, each of the range finding devices 130 includes a reflecting member 120.

It is noted that a first reflecting member 121 is preferably located at a position where the laser beam L1 emitted from the first range finding device 131 is reflected off, and a second reflecting member 122 is preferably located at a position where the laser beam L1 emitted from the second range finding device 132 is reflected off.

Moreover, the reflecting member 120 does not have to be provided for each of the range finding devices 130. There is no need to provide two or more reflecting members 120 as long as the laser beam L1 emitted from each of the range finding device 130 is reflected back to the source range finding device 130. Furthermore, the reflecting member 120 does not have to be provided only to reflect the laser beam L1. As long as the laser beam L1 is reflected, any member may be utilized as the reflecting member 120, such as the pillar 180 and a wall of the building where the vehicle system 100 is installed. In such a case, the pillar 180 and the wall are constituent features of a preferred embodiment of the present invention.

Each of the communications devices 160 transmits and receives light L2 to perform wireless communication between the vehicle 110 and a control device (not shown). Hence, the communications device 160 controls the vehicle 110. The communications device 160 includes a stationary communications device 140 and a mobile communications device 150, and performs optical wireless communication between the stationary communications device 140 and the mobile communications device 150.

The stationary communications device 140 is provided on the other end-side of the path (the side opposite the reflecting member 120 with respect to the vehicle 110). The stationary communications device 140 transmits and receives information via wireless communication with the light L2. In the vehicle system 100, each of the vehicles 110 has a stationary communications device 140. It is noted that a first stationary communications device 141 is preferably located at a position to which the first vehicle 111 corresponds, and a second stationary communications device 142 is preferably located at a position to which the second vehicle 112 corresponds. Moreover, the stationary communications device 140 is connected to a control device (not shown) with a cable. As described above, the stationary communications devices 140 are concentrated on either side of the paths. Consequently, the wiring between the stationary communications devices 140 and the control devices is made easy.

The mobile communications device 150 is provided to the vehicle 110, and transmits and receives information to and from the stationary communications device 140 with the light L2 through wireless communication. In the present preferred embodiment, the mobile communications device 150 is preferably provided on the other end-side (opposite side of the range finding device 130 on the vehicle 110) of the vehicle 110 in relation to the traveling direction of the vehicle 110. In the vehicle system 100, each of the vehicles 110 includes the mobile communications device 150. It is noted that a first mobile communications device 151 is provided to the first vehicle 111 and performs communication with the first stationary communications device 141, and a second mobile communications device 152 is provided to the second vehicle 112 and performs communication with the second stationary communications device 142.

As described above, one side of the path with respect to the vehicle 110 is utilized as a space for the range-finding laser beam L1 to travel, and the other side of the path is utilized as a space for the communication light L2 to travel. Such a feature prevents the laser beam L1 and the light L2 from interfering with each other.

Figure 3:
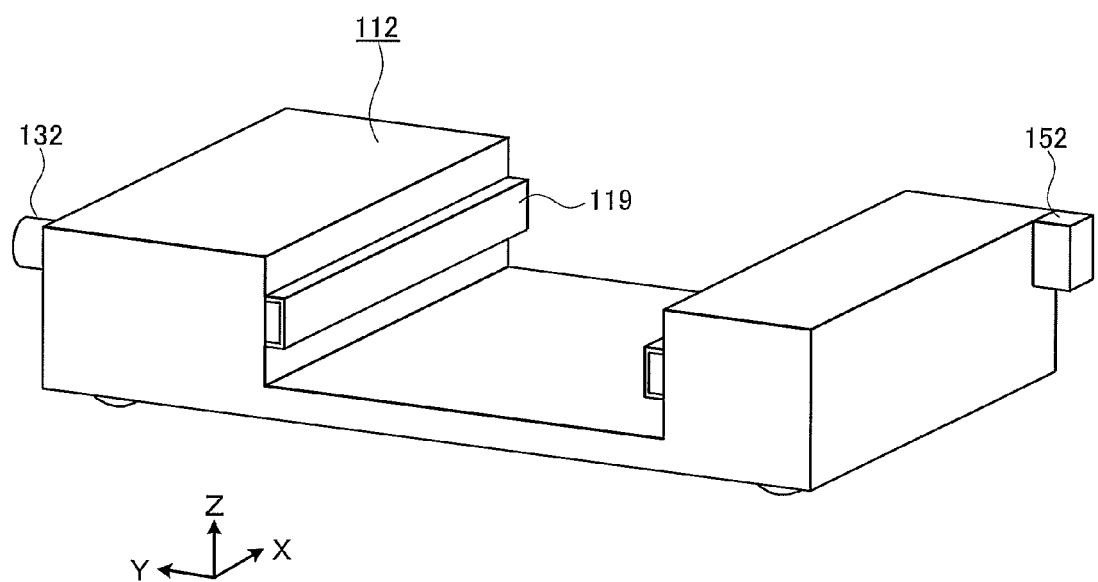
FIG. 3 depicts a perspective view which shows a second vehicle according to a preferred embodiment of the present invention.

FIG. 3 depicts a perspective view which shows the second vehicle.

Figure 4:
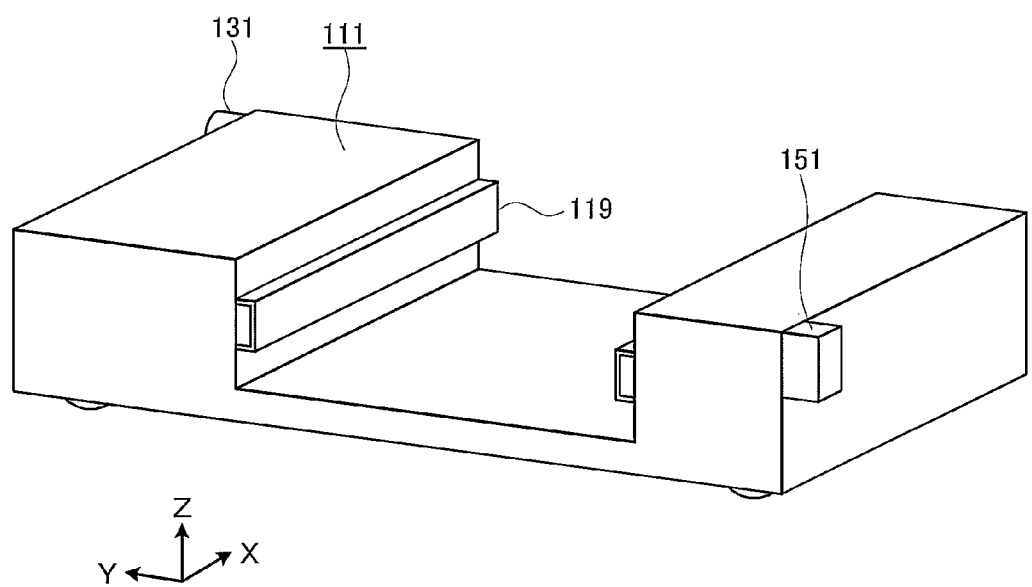
FIG. 4 depicts a perspective view which shows a first vehicle according to a preferred embodiment of the present invention.

FIG. 4 depicts a perspective view which shows the first vehicle.

Figure 5:
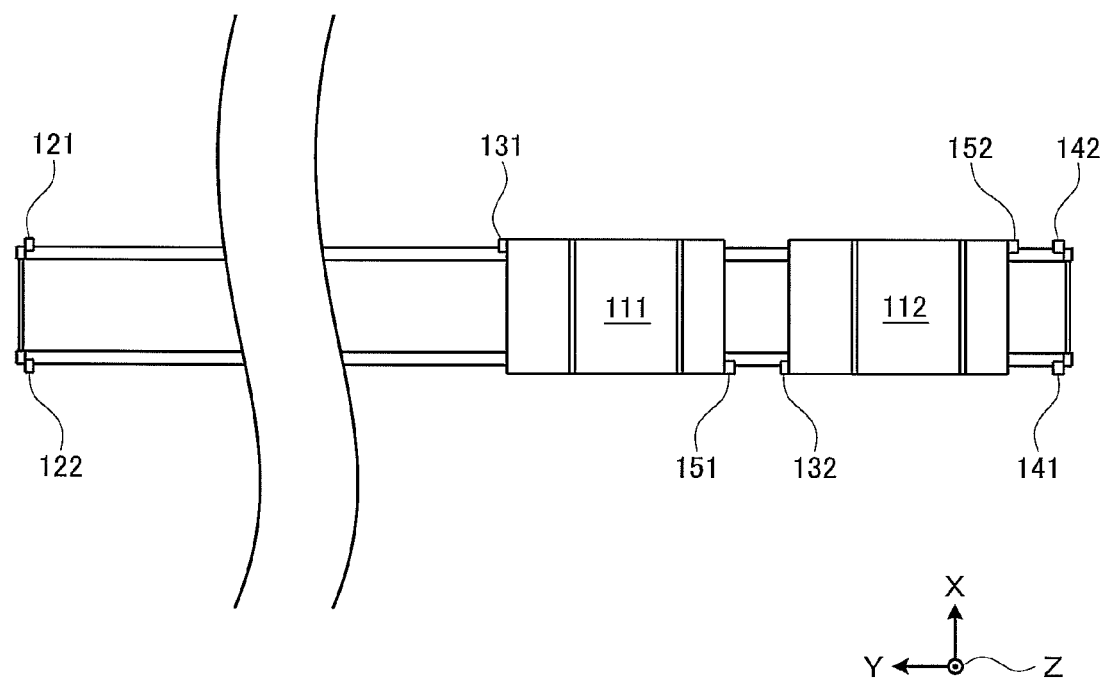
FIG. 5 depicts a perspective view which shows the first and second vehicles from the top according to a preferred embodiment of the present invention.

FIG. 5 depicts a perspective view which shows the first and second vehicles from the top.

As shown in the drawings, provided to the first vehicle 111, the first range finding device 131 is preferably attached to an end (in the back of the vehicle in relation to the x-axis direction and at the top of the vehicle in FIG. 5) of the first vehicle 111. The one end is defined in relation to a first width direction (the x-axis direction) perpendicular or substantially perpendicular to the first path. The first range finding device 131 emits the laser beam L1 to the first reflecting member 121 and receives the reflected laser beam L1. Furthermore, the first mobile communications device 151 is preferably attached to the other end (in the front of the vehicle in relation to the x-axis direction and at the bottom of the vehicle in FIG. 5) of the first vehicle 111. The other end is defined in relation to the first width direction. The first mobile communications device 151 performs communication with the first stationary communications device 141.

In contrast, the positions of the second range finding device 132 and the second mobile communications device 152, which are attached to the second vehicle 112, are opposite to those attached to the first vehicle 111. The second range finding device 132 is preferably attached to one end (in the front of the vehicle in relation to the x-axis and at the bottom of the vehicle in FIG. 5) of the second vehicle. The one end is defined in relation to a second width direction (the x-axis direction) perpendicular or substantially perpendicular to the second path. The second range finding device 132 emits the laser beam L1 to the second reflecting member 122 and receives the reflected laser beam L1. Furthermore, the second mobile communications device 152 is preferably attached to the other end (in the back of the vehicle in relation to the x-axis direction and at the top of the vehicle in FIG. 5) of the second vehicle 112. The other end is defined in relation to the second width direction. The second mobile communications device 152 performs communication with the second stationary communications device 142.

As described above, the vehicle 110 preferably includes the range finding device 130 and the mobile communications device 150 attached at opposite end-sides with each other in relation to the width direction. Such a feature further prevents the laser beam L1 and the light L2 from interfering with each other.

Furthermore, between the neighboring vehicles 110, the range finding devices 130 and the mobile communications device 150 are attached at alternately opposite end-sides with each other in relation to the width direction. Such a feature prevents each of the laser beams L1 and each of the communicating lights L2 from interfering with each other.

Moreover, the communications devices 160 included in the vehicle system 100 include a polarizing plate (not shown), and perform communication using the polarized communication light L2. Specifically, a first communications device 161, a third communications device 163, and a fifth communications device 165 perform communication, using a communication light L2 in a first polarizing direction (longitudinally polarized light in the present preferred embodiment). In contrast, a second communications device 162, a fourth communications device 164, and a sixth communications device 166 perform communication, using a communication light L2 in a second polarizing direction (latitudinally polarized light in the present preferred embodiment) whose phase is shifted 90 degrees.

As described above, the communications devices 160 provided to neighboring vehicles 110 perform communication, using the lights L2 having different polarizing directions. Such a feature prevents neighboring vehicles 110 from causing communication interference.

Furthermore, in the present preferred embodiment, the vehicle system 100 includes multiple communications devices 160 capable of communicating with different modulating frequencies. In the present preferred embodiment, the first communications device 161, the fourth communications device 164, and the fifth communications device 165 perform communication on a first modulating frequency. In contrast, the second communications device 162, the third communications device 163, and the sixth communications device 166 perform communication on a second modulating frequency which is different from the first modulating frequency.

As described above, the communications devices 160 provided to neighboring vehicles 110 perform communication, using different modulating frequencies. Such a feature prevents neighboring vehicles 110 from causing communication interference.

In the present preferred embodiment, there are preferably two polarizing directions for the communication light L2 and two modulating frequencies, for example. Hence, the vehicle system 100 preferably uses four communication states in total. Thus, every fourth vehicle 110, such as the first vehicle 111 and a fifth vehicle 115, is in the same communication status, and the vehicles 110 in the same communication status can be placed relatively apart from each other. Such a feature further prevents the communications devices 160 from causing communication interference.

It is noted that the present invention shall not be defined only by the preferred embodiments described above. The preferred embodiments described above exemplify two polarizing directions and two modulation frequencies, for example. In the preferred embodiments, either may be included and used. Furthermore, the preferred embodiments of the present invention may also use three or more polarizing directions and modulation frequencies, or a combination thereof, for example.

Any given combination of the constitutional features described in the specification may be used to implement a preferred embodiment of the present invention other than the above described preferred embodiments. The disclosed preferred embodiments are examples in all respects. The scope of the present invention shall be defined not by the above description but by claims, and shall include all modifications which are equivalent to and within the scope of the claims.

For example, a preferred embodiment of the present invention includes the vehicles 110 moving on the rails. Instead, the vehicles 110 may have tires and shuttle on a floor with no rail.

The words such as "vertical" "plane", and "parallel" are used within a margin of error (variation) without departing from the intents of the present invention.

Preferred embodiments of the present invention may preferably be used for a vehicle system including closely-arranged multiple vehicles and, in particular, are applicable to an automated warehouse including a transfer vehicle for each level of a rack.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An automated warehouse comprising:
a rack including a plurality of shelves;
a pair of rails provided on each of the plurality of shelves, such that a total number of rails is twice a total number of shelves;
a first vehicle that shuttles on a first path which is a linear path provided by a first one of the pairs of rails;
a second vehicle that shuttles on a second path which is parallel or parallel to and vertically spaced from the first path, and which is provided by a second one of the pairs of rails;
a first reflecting member located on a first end of the first path;
a first range finding device which measures, using a laser beam, a distance between the first reflecting member and a first end of the first vehicle that faces the first reflecting member, the first end of the first vehicle being defined in a direction of a first width perpendicular or perpendicular to the first path;
a first communications system including:
   a first stationary communications device which is located on a second end of the first path, and which performs optical wireless communication; and
   a first mobile communications device which is attached to a second end of the first vehicle that faces the first stationary communications device, the second end of the first vehicle being defined in the direction of the first width and configured to perform wireless communication with the first stationary communications device;

a second reflecting member located on a first end of the second path;

a second range finding device which measures, using a laser beam, a distance between the second reflecting member and a first end of the second vehicle that faces the second reflecting member, the first end of the second vehicle being defined in a direction of a second width that is perpendicular or perpendicular to the second path; and a second communications system including:
 a second stationary communications device which is located on a second end of the second path, and which performs optical wireless communication; and
 a second mobile communications device which is attached to a second end of the second vehicle that faces the second stationary communications device, the second end of the second vehicle being defined in the direction of the second width and configured to perform wireless communication with the second stationary communications device; wherein the first vehicle is the only vehicle provided on the first path;

the second vehicle is the only vehicle provided on the second path;

the first vehicle and the second vehicle are each configured to transfer one or more articles;

the first vehicle and the second vehicle are disposed so that the direction of the first width and the direction of the second width are parallel or parallel to each other; and the first mobile communications device and the second mobile communications are disposed on opposite sides of a virtual plane which joins a center of the first width and a center of the second width, and extends along the first path and the second path.

2. The automated warehouse according to claim 1, wherein
 the first communications system includes a first polarizing plate, and the first stationary communications device and the first mobile communications device perform communication using light in a first polarizing direction; and
 the second communications device includes a second polarizing plate, and the second stationary communications device and the second mobile communications device perform communication using light in a second polarizing direction which is different from the first polarizing direction.

3. The automated warehouse according to claim 1, wherein
 the first stationary communications device and the first mobile communications device perform communication on a first modulation frequency; and
 the second stationary communications device and the second mobile communications device perform communication on a second modulation frequency which is different from the first modulation frequency.

4. The automated warehouse according to claim 1, further comprising:
 a third vehicle that travels on a third path and that performs wireless communication, using a third communications device; and
 a fourth vehicle that travels on a fourth path and that performs wireless communication, using a fourth communications device; wherein the first mobile communications device performs communication on a first modulation frequency, using light in a first polarizing direction;

the second mobile communications device performs communication on a second modulation frequency, using light in a second polarizing direction;

the third communications device performs communication on the second modulation frequency, using light in the first polarizing direction; and the fourth communications device performs communication on the first modulation frequency, using light in the second polarizing direction.

5. The automated warehouse according to claim 1, wherein the first stationary communications device and the second stationary communications device are provided on a same side of the first path and the second path.

6. A range finding method for an automated warehouse which includes a rack including a plurality of shelves, a first vehicle that shuttles on a first path which is a linear path, and a second vehicle that shuttles on a second path which is parallel or parallel to and vertically spaced from the first path, the range finding method comprising the steps of:
 measuring, via a first range finding device using a laser beam, a distance between a first reflecting member which is provided on a first end of the first path and a first end of the first vehicle that faces the first reflecting member, the first end of the first vehicle being defined in a direction of a first width that is perpendicular or perpendicular to the first path;
 performing optical wireless communication between a first stationary communications device which is provided on a second end of the first path and a first mobile communications device which is attached to a second end of the first vehicle that faces the first stationary communications device, the second end of the first vehicle being defined in the direction of the first width;
 measuring, via a second range finding device using a laser beam, a distance between a second reflecting member which is provided on a first end of the second path and a first end of the second vehicle that faces the second reflecting member, the first end of the second vehicle being defined in a direction of a second width that is perpendicular or perpendicular to the second path; and
 performing optical wireless communication between a second stationary communications device which is provided on a second end of the second path and a second mobile communications device which is attached to a second end of the second vehicle that faces the second stationary communications device, the second end of the second vehicle being defined in the direction of the second width and opposite to the first mobile communications device in the direction of the first width; wherein a pair of rails are provided on each of the plurality of shelves of the rack, such that a total number of rails is twice a total number of shelves;

the first path is provided by a first one of the pairs of rails, and the first vehicle is the only vehicle provided on the first path;

the second path is provided by a second one of the pairs of rails, and the second vehicle is the only vehicle provided on the second path; and the first vehicle and the second vehicle are each configured to transfer one or more articles.

* * * * *